United States Patent [19]

Hauser et al.

[11] 4,155,972
[45] May 22, 1979

[54] MULTIPLE-SHOT METHOD OF MOLDING PLASTIC PRODUCTS

[75] Inventors: David A. Hauser; Thomas J. Parrott, both of Rockford, Ill.

[73] Assignee: Keystone Consolidated Industries, Inc., Peoria, Ill.

[21] Appl. No.: 830,593

[22] Filed: Sep. 6, 1977

[51] Int. Cl.$^2$ .................. B29C 5/00; B29C 21/00; B29D 3/00
[52] U.S. Cl. .................. 264/250; 264/246; 264/267; 264/271
[58] Field of Search .......... 264/97, 98, 171, 250, 264/255, 245, 246, 328, 176 R

[56] References Cited

U.S. PATENT DOCUMENTS

| | | | |
|---|---|---|---|
| 3,086,250 | 4/1963 | Gits | 264/250 |
| 3,354,249 | 11/1967 | Morin | 264/255 |
| 3,457,337 | 7/1969 | Turner | 264/98 |
| 3,486,196 | 12/1969 | Klenk et al. | 264/173 |
| 3,661,685 | 5/1972 | Osteen | 156/306 |
| 3,681,167 | 8/1972 | Moore | 428/412 |
| 3,719,735 | 3/1973 | Valyi | 264/255 |
| 3,810,815 | 5/1974 | Welhart et al. | 428/412 |
| 3,878,282 | 4/1975 | Bonis et al. | 264/255 |
| 3,980,744 | 9/1976 | Cogswell | 264/98 |
| 3,997,677 | 12/1976 | Hirsch et al. | 428/412 |

OTHER PUBLICATIONS

Mark, et al., Encyclopedia of Polymer Science & Tech. Interscience Pub. (N.Y.) vol. I (1964), pp. 299, 300, 306, 307 & 308 and vol. 10 (1970), pp. 468, 472, 473, 474, 475, 728, 735, 736, 749 & 750.

*Primary Examiner*—W. E. Hoag
*Attorney, Agent, or Firm*—Allegretti, Newitt, Witcoff & McAndrews

[57] ABSTRACT

An improved method for molding a unitary molded product comprised of three separate plastic materials includes the first step of molding the generally highest melting point, most abrasive, most viscous plastic material to mold a first form. Subsequently, the next generally lower melting point material is molded using the first form as a mold. Finally, the generally lowest melting point material is molded. By molding in a designated order, it is possible to mold a single product comprised of multiple plastic materials without having the materials bleed into one another. Additionally, a variety of materials having distinct melting points may be used to make a unitary molded product.

1 Claim, 9 Drawing Figures

MULTIPLE-SHOT METHOD OF MOLDING PLASTIC PRODUCTS

BACKGROUND OF THE INVENTION

This invention relates to an improved method for molding a unitary product comprised of multiple plastic materials.

Push buttons for the control mechanism of various electrical products and appliances, such as radios and the like, are often molded of plastic material. A desirable feature of such push buttons is the inclusion of lettering or indicia indicating the operation associated with the push button. Preferably, such lettering is colored to contrast with the color of the push button. Additionally, the push button may be lighted to accentuate the position of the button as well as the lettering on the button.

It has been suggested that a push button structure which includes the desirable feature of contrasting or lighted lettering may be fabricated from a plurality of separate plastic materials. For example, the push button itself may be made from a black plastic whereas the letters for the push button may be fabricated from a white plastic material. The button is preferably hollow and filled with clear plastic. A rod may project from the clear plastic to conduct light to the push button or to serve as a switch actuator.

Though the structure of the described push button is known, successful methods for manufacture of such structure were not available. For example, a typical difficulty encountered in the manufacture of a unitary plastic push button made from three separate plastics of distinct color is that the plastics "bleed" or intermix during molding. To overcome this problem and provide an improved method of manufacture of parts comprised of multiple plastics the present invention was developed.

SUMMARY OF THE INVENTION

The present invention of an improved method of manufacture of a unitary molded product comprised of a plurality of separate plastic materials includes the steps of identifying the melting point, abrasiveness, viscosity and flowability of the separate materials forming the unitary molded product; molding the generally highest melting point, most highly abrasive, highest viscosity and least flowable material into a first desired shape or form; subsequently molding the next relatively lower melting point, lesser abrasive, lower viscosity and higher flowability material using the initially molded part, at least partially, as a form and continuing in successive steps of molding with each material while simultaneously utilizing the previously molded materials as part of the mold form.

It is thus an object of the present invention to provide an improved molded product comprised of a plurality of separate plastic materials.

Still a further object of the present invention is to provide an improved molded product wherein the final product is molded in a series of steps with the intermediate molded products comprising a part of the mold for the succceeding steps in the process so as to produce a final unitary molded product.

One further object of the present invention is to provide a molded product which is easy to manufacture and which is comprised of a plurality of separate plastic materials which do not bleed into each other during the molding operation.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

In the following, there is disclosed a step by step process for the molding of a unitary part made up of a plurality of separate materials. The general approach in the manufacture of such a part is to separate the component materials according to melting point, abrasiveness, viscosity and flowability. The material generally having the highest melting point should be first molded into a form. This material is generally the most viscous, most abrasive and least flowable. The first form may be used to define at least a portion of a mold for succeeding molding operations. Successive steps in the molding operation are performed utilizing materials having succeedingly lower melting points, lower abrasiveness, lower viscosity and more flowability. It is possible to fabricate many useful items using the procedure outlined above.

Figure 1:
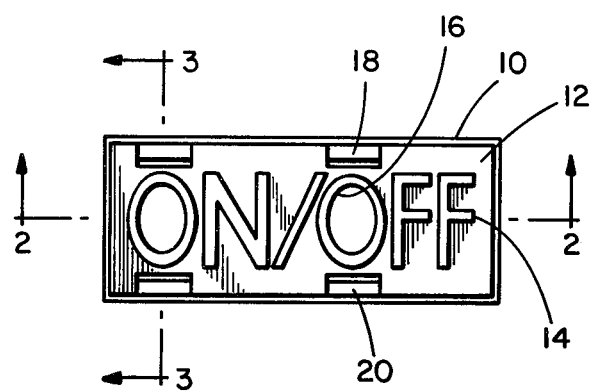
FIG. 1 is a top plan view of the first molded section or form of the final molded product.
Figure 2:
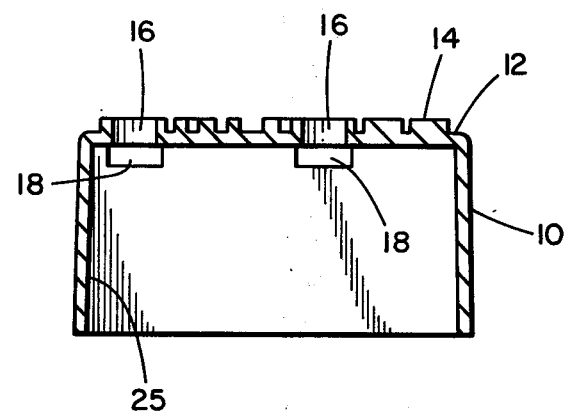
FIG. 2 is a cross-sectional view taken substantially along the line 2—2 in FIG. 1.
Figure 3:
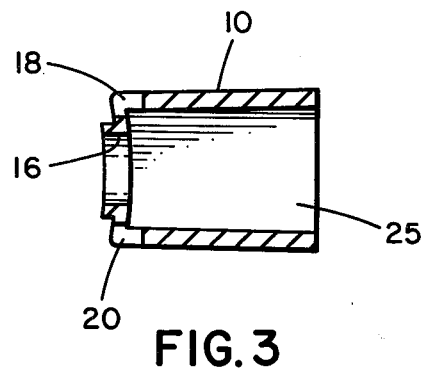
FIG. 3 is a cross-sectional view taken substantially along the line 3—3 in FIG. 1.
Figure 4:
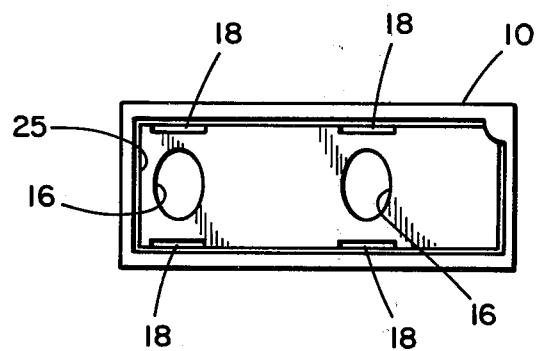
FIG. 4 is a bottom plan view of the structure of FIG. 1.
Figure 5:
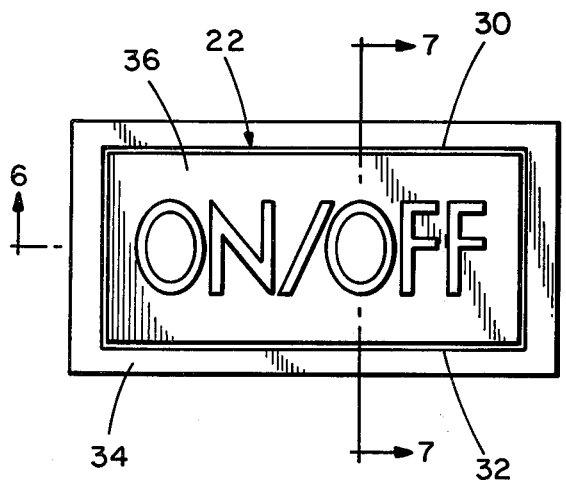
FIG. 5 is a top plan view of the second molded section or form of the present invention.
Figure 6:
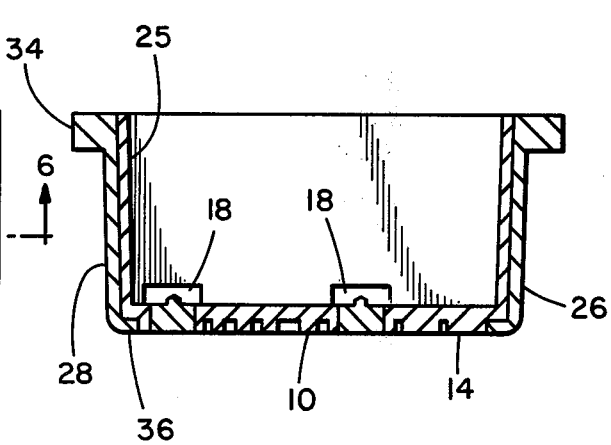
FIG. 6 is a cross-sectional view of the form of FIG. 5 taken along the line 6—6.
Figure 7:
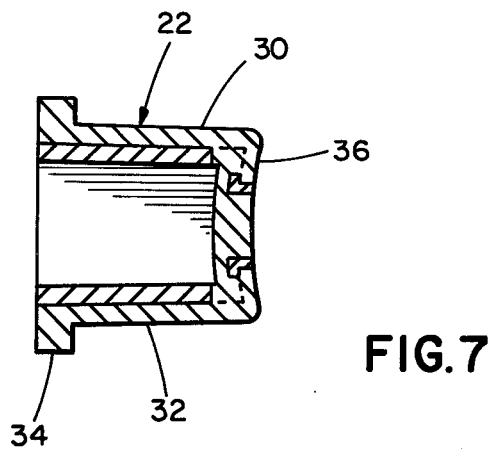
FIG. 7 is a cross-sectional view taken along the line 7—7 in FIG. 5.
Figure 8:
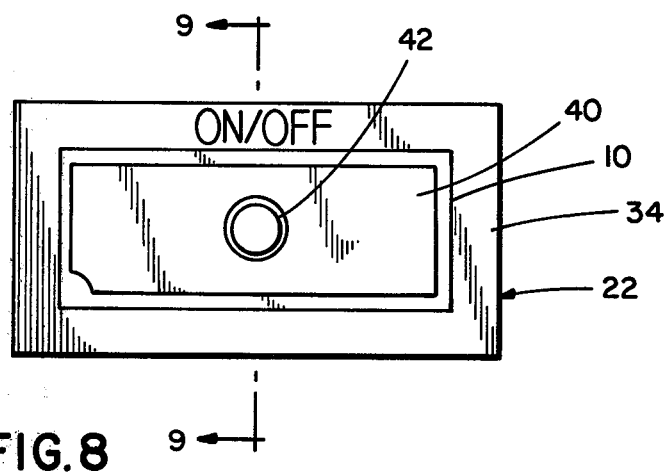
FIG. 8 is a bottom plan view of the third or final stage molded section or form of the invention.
Figure 9:
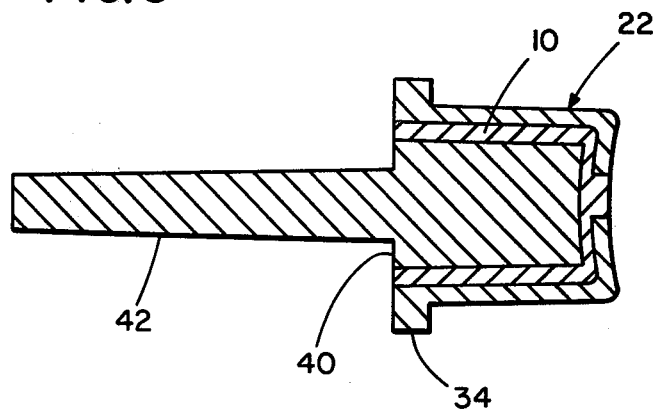
FIG. 9 is a cross-sectional view of the final form of FIG. 8 taken along the line 9—9.

The method of the present invention is described in the context of the steps and procedures for the manufacture of an on-off push button switch for an automobile radio. FIGS. 1 through 4 illustrate a specific example of a molded form associated with a first molding step. FIGS. 5 through 7 illustrate the form associated with a second molding step, and FIGS. 8 and 9 illustrate a final molded product. The invention is not, however, limited to such a product or to a three-step process.

The push button switch is made from three distinct types of plastic material each material being molded in a separate molding step and by means of a separate mold. All or part of the separate molds may be comprised of the previously molded part made in the preceeding molding steps. In the first molding step, a polycarbonate, preferably a white polycarbonate, is formed or molded in a manner known to those skilled in the art, for example, by an injection molding process. Thus, the particular molding method to form the product or form illustrated by FIGS. 1 through 4 is known.

Referring to FIGS. 1-4, the form molded by the first step is known as a diffuser 10. Preferably, the diffuser 10 is molded from a white polycarbonate material having a melting point of about 550° F., such as the trade name product "Lexan" manufactured by General Electric Company. The diffuser 10 includes planer surface 12 having raised indicia 14 molded thereon. The indicia 14 are comprised of various letters, numerals or designs as required. In the embodiment shown, the indicia 14 spell "on/off". Note that some of the indicia, namely the letter "O", are closed.

Molding a closed letter for the diffuser 10 requires defining a passage 16 through the surface 12. The passage 16 in combination with flow passages 18 and 20 in side walls 19 and 21, respectively, provide a means for filling the center of the closed letters with plastic material during the second stage of the molding operation. The diffuser 10 also includes opposed end walls 23 and 25.

The walls 19, 21, 23, 25 are connected to form a rectangular enclosure. This enclosure in combination with the surface 12 defines, at least in part, the mold for the second and third stages of the method of the invention. In the present instance, the diffuser 10 serves as the inside mold to form a shell 22 molded over the diffuser 10 during the second stage of the molding operation. In the second stage of the molding operation, polyethylene, which has a melting temperature of approximately 375° F., such as the trade name product "Alathon" manufactured by DuPont, or nylon, which has a melting point of about 500° F., such as the trade name product "Zytel" manufactured by DuPont, is used to form shell 22 over the diffuser 10. Note that polyethylene and nylon have a lower melting point temperature than the polycarbonate diffuser 10. Also, the abrasiveness is lower, viscosity is higher and flowability is higher in general. It is important that the second stage of molding be performed with a material generally having the described different melting point, abrasiveness, viscosity and flowability characteristics relative to the comparable characteristics of the first stage molding material.

The shell 22 utilizes the diffuser 10 as the interior part of the second stage mold. The remainder of the mold may be fabricated in a manner known to those skilled in the art. Note that the polyethylene material forming the shell 22 flows into the openings 18 and 20 and through passage 16 to fill the closed indicia.

The material, polyethylene or nylon, forming the shell 22 is of a color that contrasts with the color of the material forming the diffuser. In the example given, the shell 22 is formed from a black polyethylene plastic. Because the melting point of the material forming the shell 22 is less than that of the material forming the diffuser 10, the diffuser 10 does not melt and bleed with respect to the shell 22 during the molding operation. Thus, as illustrated in FIGS. 5-7, the shell 22 includes opposite end walls 26 and 28 as well as opposed side walls 30 and 32 and a circumferential flange 34. The side walls 26, 28, 30 and 32 are joined with a top push button surface 36 which is flush with the top of the indicia 14 thereby giving the push button a smooth surface appearance.

The final step in the molding operation is illustrated by FIGS. 8 and 9. In the final step, the next generally lower melting point material is molded using the diffuser 10 as part of the mold. The material also is generally the least abrasive, most viscous and has the highest flowability. Acrylic having a melting point of 400° F. has been chosen as the next material. The acrylic chosen for the push button disclosed is a clear acrylic. The acrylic may be molded to form a projecting light tube or an actuator termed a pipe 42. Thus, the interior cavity of the diffuser 10 is filled with a clear acrylic block 40 having a projecting generally cylindrical pipe 42. The cross-sectional shape of the pipe 42 is not a limitation. Likewise, the extent and direction of the projecting pipe is not a limitation. Finally, more than one pipe may be provided.

The melting point of the acrylic is generally less than that of the previously molded material, particularly the polycarbonate diffuser 10. Additionally, in the embodiment disclosed, the previously molded diffuser form 10 serves as part of the mold form for the acrylic. Finally, the acrylic is clear so that light may be directed by stem or pipe 42 into block 40 to thereby light the indicia 14 of the diffuser 10. Pipe 42 may also serve the function of mechanical actuation for a switch associated with the push button.

Following are additional examples of the identity of mold materials, and the order of molding in a multi-shot or multi-stage process as contemplated by the invention:

| Ex. No. | Stage 1 Material | Stage 2 Material | Stage 3 Material |
| --- | --- | --- | --- |
| 1 | Polycarbonate, 550° F. melting point (m.p.) | Nylon, 500° F. m.p. | Acrylic, 400° F. m.p. |
| 2 | Polycarbonate, 550° F. m.p. | ABS, 450° F. m.p. | Acrylic, 400° F. m.p. |
| 3 | Polycarbonate, 550° F. m.p. | ABS, 450° F. m.p. | Polystyrene, 350° F. m.p. |
| 4 | ABS, 450° F. m.p. | Polyethylene, 400° F. m.p. | Polystyrene, 350° F. m.p. |
| 5 | ABS, 450° F. m.p. | Nylon, 500° F. m.p. | Acrylic, 400° F. m.p. |
| 6 | ABS, 450° F. m.p. | Vinyl, 400° F. m.p. | Acrylic, 400° F. m.p. |

Note that when the difference in melting point temperature is more than 100° F. between successive stages, that the factors of flowability, abrasiveness and viscosity play a very small role in choice of materials. When the difference in melting point temperature is less than 100° F. or when there is no difference or the successively molded material has a higher melting point, the factors of abrasiveness, viscosity and flowability become important. That is, the successively molded material generally must have lower viscosity, lower abrasiveness and higher flowability in such instances. The examples reflect this, particularly Example 5.

Thus, while there has been set forth a preferred embodiment, the invention is to be limited only by the following claims and their equivalents.

What is claimed is:

1. An improved method for manufacture of a unitary molded product of multiple plastic materials said product including a first material forming a base and defining indicia, a second material surrounding the outside of the base and surrounding, but not covering the indicia, and a third material within the base, said method comprising, in combination, the steps of:

(a) selecting a first translucent material from a group consisting of polycarbonates having a melting point range of 500-600 deg. F.;

(b) molding the first selected material into a solid base using a plastic molding process with the base having an inside and an outside with raised indicia;
(c) selecting a second opaque material from a group consisting of polyethlene, nylon and other plastics having a melting point of 350–500 deg. F.;
(d) molding the second material to form a solid, two-material, unitary form utilizing the molded product of step (b) at least in part as the mold form to surround the outside of the first material except for the indicia;
(e) selecting a third transparent material from a group consisting of acrylic and other plastics having a melting point of about 425 deg. F. and less; and
(f) molding the third material to form a solid, three-material, unitary product utilizing the molded product of step (d) at least in part as the mold form, said third material at least in part being formed against the inside of said base, said molding the third material including forming a projection integral with the exposed portion of the third material whereby said projection may be adapted to serve as a light pipe for lighting said indicia or as a mechanical actuator.

* * * * *